United States Patent [19]
Hebert

[11] 3,751,093
[45] Aug. 7, 1973

[54] ENERGY STORING RECOVERABLE BUMPER SYSTEM

[75] Inventor: Victor F. Hebert, San Jose, Calif.

[73] Assignee: Houdaille Industries, Inc., Buffalo, N.Y.

[22] Filed: Apr. 22, 1971

[21] Appl. No.: 136,375

[52] U.S. Cl. .................................. 293/89, 293/70
[51] Int. Cl. ........................................... B60r 19/06
[58] Field of Search ................... 293/85, 86, 89, 70

[56] References Cited
UNITED STATES PATENTS

| 3,702,202 | 11/1972 | Rumsey | 293/89 |
| 3,172,268 | 3/1965 | Gensheimer | 61/48 |
| 3,433,520 | 3/1969 | Kearns et al. | 293/85 |
| 2,186,137 | 1/1940 | Halladay | 293/85 |

Primary Examiner—Gerald M. Forlenza
Assistant Examiner—Robert Saifer
Attorney—Hill, Sherman, Meroni, Gross & Simpson

[57] ABSTRACT

A horizontal bumper is supported in relation to a support such as a vehicle frame by jacking and roll-preventing bracket structure which is adapted to transmit to the frame impacts against the bumper transversely relative to the vehicle but permits the bumper to displace relatively toward the frame in response to inboard pressures or impacts against the bumper, with the impact energy stored in resilient buckling column bars thrustably interposed endwise between the bumper and the frame. To accommodate conditions where resilient flexing of the buckling column bars in a horizontal direction is not feasible, the arrangement enables the buckling columns to flex in a generally vertical direction.

15 Claims, 3 Drawing Figures

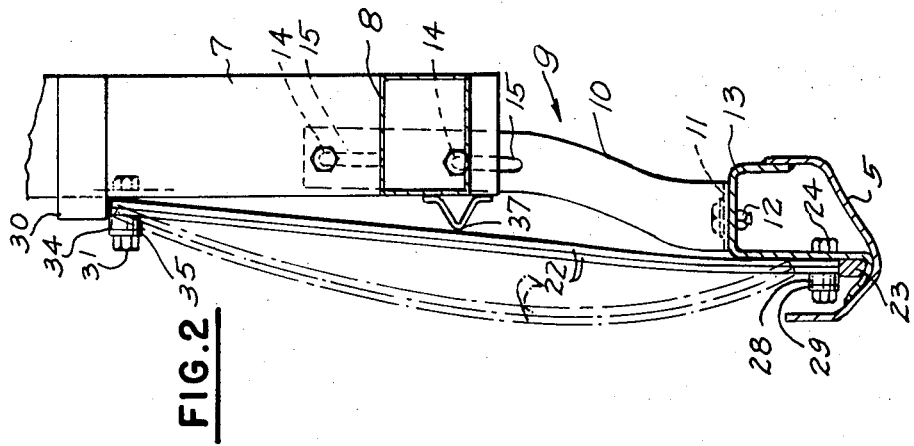
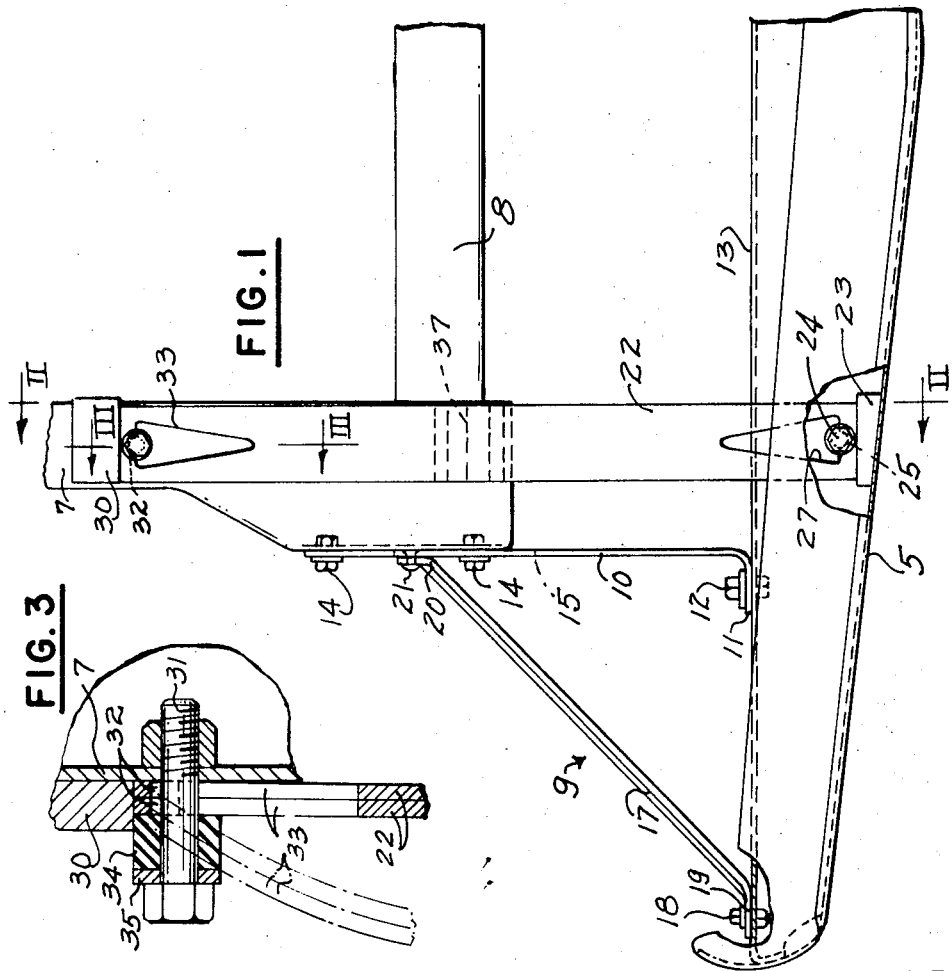
INVENTOR
VICTOR F. HEBERT
By
Attys

ENERGY STORING RECOVERABLE BUMPER SYSTEM

This invention relates generally to energy storing bumper support systems utilizing resilient buckling column bars, and is more particularly concerned with the mounting of automobile bumpers in a manner to protect the same and the adjacent structure of the vehicle against damage from at least minor collisions to which such bumpers may be subject in the operation of the associated vehicles.

Any moving object develops a certain kinetic energy level proportional to its speed or velocity squared. When the moving object impacts against another moving object or a non-moving object, this kinetic energy must be dissipated and this may occur by deformation of structure or by being stored or absorbed, for example, in a bumper system.

Relating the foregoing specifically to automotive vehicles, and more particularly to automobiles, excessive damage to not only the bumpers but also the adjacent portions of the vehicles has been experienced in respect to present-day bumper designs which have, to a large extent, become mainly decorative trim for the vehicles. Further, it is generally known that in the automobile industry designers are extremely reluctant to sacrifice any styling potentialities, so that there has been a wide drift away from and a virtual impossibility to return to the rugged spring bumpers of an earlier day when the bumpers themselves were generally constructed to absorb rather significant impacts without damage either to the bumpers or to the associated vehicle structure. For reasons of expediency, present-day bumpers are generally constructed of relatively soft steel virtually lacking in spring characteristics and unduly liable to be dented and cracked under rather low velocity impacts, and more particularly impacts occurring as low as 3 miles per hour up to about ten miles per hour of one vehicle relative to another where the bumpers are mounted in an essentially fixed or rigid manner to the vehicle frame. To alleviate this serious present-day damage situation, with damage claims mounting to exorbitant proportions, various expedients have heretofore been proposed, such as constructing the bumpers of fluid-filled resilient tubes, or equipping them with rubber cushions, but such expedients have been largely resisted due to detraction from designer latitude, cost, unattractive appearance, and the like. Coiled springs or rubber cushions behind the bumpers have been proposed, but these have been unsatisfactory because they introduce an undesirable spring performance characteristic into the system which is representable by a chart curve showing unduly soft resistance at the beginning of impact, thus requiring excessive travel distance or forces to be effective. A further proposal has been to provide collapsibly yieldable structure in the bumper system, but that requires replacement of the system or parts of the system or a physical resetting after impact. Although hydraulic buffers or dampers are highly efficient and may be used in such systems, they are not as versatile as desirable in respect to the direction of impact force, and they add unreasonable cost to original equipment, especially in medium and low priced automobiles, and purchasers resist the expenditure where offered as optional equipment.

Meanwhile, collision insurance rates have necessarily escalated because of the rising volume and size of damage claims, a significant proportion of which result from relatively minor car-to-car collisions where relative vehicle movement is no more than from about three to ten miles per hour, such as in parking lot maneuvering, start-up situations, and congested traffic incidents. This situation has become so serious that not only has there been an indication by the insurance industry of a willingness to reduce collision premiun rates by as much as 20 percent on automobiles which can withstand at least a 3 mile per hour rear end bumper impact and 5 mile per hour front end bumper impact without damage, but also Governmental standards have been or are being implemented to this end.

It is to the attainment of the desirable objective of meeting and solving the problems just outlined and to overcoming the deficiencies, defects, inefficiencies, shortcomings and undesirable factors in prior arrangements and proposals that the present invention is directed.

An important object of the present invention is to provide a new and improved energy storing bumper support system which will meet at least the minimum requirements for storing of impact or collision force energy without damage to bumpers or adjacent portions of the vehicle.

Another object of the invention is to provide a new and improved energy storing bumper support system which can be produced and installed at low cost.

A further object of the invention is to provide a new and improved energy storing bumper support system adapted to be installed without extensive modification of bumper or vehicle structure from current designs and permitting wide latitude in designer's options.

Still another object of the invention is to provide a new and improved energy storing bumper support system providing for generally vertical deflection of the buckling column bars.

Other objects, features and advantages of the invention will be readily apparent from the following description of a preferred embodiment thereof, taken in conjunction with the accompanying drawing, although variations and modifications may be effected without departing from the spirit and scope of the novel concepts embodied in the disclosure, and in which:

FIG. 1 is a fragmentary plan view of a representative bumper system embodying features of the invention;

FIG. 2 is a vertical sectional detail view taken substantially along the line II—II of FIG. 1; and FIG. 3 is an enlarged fragmentary sectional detail view taken substantially along the line III—III of FIG. 1.

In the representative form of the invention illustrated, a bumper 5 is constructed and arranged to be supported protectively at the front or rear of an automotive vehicle such as an automobile having a chassis including a supporting frame including longitudinally extending frame members or bars 7, only one of which is shown for economy of space in the drawing, and the bars are connected by transverse means or bars 8.

Attachment of the bumper 5 to the frame is effected by means serving not only to support the bumper in the preferred relation and horizontal elevation to the frame but also against deflection relative to the frame in a vertical direction under jacking loads or forces tending to roll the bumper over relative to the frame, such means herein comprising a substantially rigid attachment and jacking bracket structure 9 comprising a longitudinally extending bar 10 having its width vertical and provided with a front end lateral attachment flange 11 secured by means of a bolt 12 or rivet or welding to a reinforcing beam structure 13 suitably secured rigidly to and within the shell of the bumper 5. In order to support the bumper at an elevation which is slightly higher than the top elevation of theframe bar 7, the jacking bar 10 is generally ogee curved shaped as shown in side elevation in FIG. 2. Attachment of the jacking bar 10 to the frame 7 is through a flat rear end portion of the bar 10 which engages face-wise against the adjacent front end portion of the frame 7 and is secured thereto by means of a pair of longitudinally spaced bolts 14 the shanks of which extend through suitable respective longitudinally extending aligned slots 15 affording a predetermined range of relative inward and outward movement of the bar 10 and the supported bumper assembly, such as on the order of 2 inches – 3 inches, depending on whether it is a front or rear bumper, and other considerations in the structural environment or design of the particular vehicle with which associated. It will be understood that the length of the slots 15 defines the limit of relative inboard movement of the bumper assembly with respect to the supporting frame of the vehicle. To protect the bumper supporting bar 10 against bending due to impact against the bumper, transversely relative to the vehicle, a rigid reinforcing strut bar 17 is provided which extends diagonally inwardly from attachment as by means of a bolt or rivet 18 securing a flange 19 thereof to the adjacent extremity portion of the reinforcement 13, toward an attachment flange 20 secured by rivets 21 rigidly to the bar 10 between the slots 15. Thereby, a rigid triangular relationship is defined between the jacking bar 10, the bumper, and more praticularly the bumper reinforcement 13, and the strut 17.

In a stable, efficient relationship, an energy-storing, resilient buckling column structure is provided by means of longitudinally extending buckling column bars 22 associated with and between each of the longitudinal vehicle frame members 7 and the bumper 5 whereby the bumper is normally held in its outboard extended relation relative to the frame, that is to the outward limit of projection relative to the frame permitted by the slots 15 on inboard impact against the bumper, or pressure of a possibly damaging magnitude applied by the vehicle toward the bumper while the bumper is held against an unyielding object, energy storing yielding of the bumper and frame toward one another within the limits of the slots 15 is enabled. To this end, the resilient buckling column bar means at each side of the vehicle comprises at least one bar and in the instance illustrated two identical bars 22 in free coextensive laminar relation but with their opposite ends connected to respectively to the bumper and the frame. in this instance, the bars 22 are supported in a manner to flex vertically in response to endwise compressive forces thereagainst. Accordingly, the bars are mounted with their major widths extending generally horizontally, their outer end portions supported by the bumper reinforcing bar 13, and their outer end extremities in bearing engagement with abutting means in the form of a reinforcing thrust block 23 carried by the inboard surface of the bumper 5.

To maintain the outboard end portions of the bars 22 in place relative to the abutment 23, retaining means desirably in the form of a pin or bolt 24 carried vertically by the reinforcing bar or beam 13 engages through a clearance opening 25 in such end portions adjacent to the bearing end. Extending longitudinally inwardly relative to the opening 25 is a slot 27 for facilitating and controlling buckling action of the column bars and relieving stress during buckling. The slot has an end adjacent to the opening 25 and an opposite end remote from the opening. Desirably the slot 27 is of teardrop or lanceolate shape having its largest dimension adjacent to the opening 25 and its smallest dimension at the remote end of the slot. Although the opening 25 and the slot 27 may be separately formed and separated by an intervening portion of the bar, they are desirably connected so that the slot is an extension from the opening, with the opening 25 a half-round notch in the base of the largest dimension of the slot and adapted to receive about 180° of the bolt shank perimeter. The enlarged portion of the slot provides clearance for the bolt head and customary washer during buckling action of the buckling column bar structure. Pivotal movement of the attached end portion of the bars 22 relative to the reinforcing beam 13 and the bolt 24 is facilitated by providing a resilient rubberlike cushion, vibration damper and resilient take-up pad or block 28 between the bolt head and a washer 29 and the engaged end portion of the bar.

A similar connection is effected between the inboard end portion of the bar assembly 22 and the frame 7 which for this purpose has abutment means in the form of a welded or otherwise rigidly attached thrust block 30 against which the inner end of the bar assembly thrusts in bearing engagement. To maintain the inboard end portions of the bars 22 in place relative to the abutment 30, retaining means desirably in the form of a pin or bolt 31 carried vertically by the frame member 7 engages through a clearance opening 32 is such end portions adjacent to the bearing end. Extending longitudinally inwardly relative to the opening 32 is a slot 33 for facilitating and controlling buckling action of the column bars and relieving stress during buckling. The slot has an end adjacent to the opening 32 and an opposite end remote from the opening. Desirably the slot 27 is of teardrop or lanceolate shape having its largest dimension adjacent to the opening 32 and its smallest dimension at the remote end of the slot. Although the opening 32 and the slot 33 may be separately formed and separated by an intervening portion of the bar, they are desirably connected so that the slot is an extension from the opening, with the opening 32 a half-round notch in the base of the largest dimension of the slot and adapted to receive about 180° of the bolt shank perimeter. The enlarged portion of the slot provides clearance for the bolt head and customary washer during buckling action of the buckling column bar structure. A rubber-like, cushioning and take-up pad or block 34 is preferably interposed between a washer 35 at the bolt head and the end portion of the nearest bar 22.

While the buckling column bar assembly 22 is shown as conveniently mounted above the frame 7, to buckle upwardly under impact, it will be appreciated that where upward deflectional head room is not available the buckling column bar assembly may be with equal efficiency mounted in a manner to buckle downward, in such instance being suitably connected between the bottom of the reinforcing beam or bar 13 and the bottom of the frame member 7.

In order to assure smooth buckling of the bar assembly 22 away from the frame 7, biasing means may be provided such as a prebow slightly in the desired buckling direction. Alternatively or in addition thereto a rigid projection 37 may be mounted on the outboard end portion of the frame 7 to thrust toward the bars 22 in the direction they are intended to buckle, namely, in the instance illustrated, upwardly.

Construction of the buckling column bars 22 is such that in operation they will attain a high resistance level to endwise impact forces thereagainst initially and maintain that resistance relatively constant throughout the available bumper support system travel stroke. That is, the bars 22 will buckle resiliently within their elastic limits calculated to resist the full range of permissible movement between the bumper and the frame and then, when the impact or other pressure is relieved, return resiliently to normal position, thereby returning the bumper to its normal position. The bars 22 are constructed from suitable spring material, such as SAE 1060 to 1080 steel heat-treated after formation to attain substantially bainite characteristics with a high degree of toughness, strength and resilience. Typically, the bars 22 may be of about ⅛ inch to 0.4 inch by 2 inches to 6 inches cross section and with the effective lengths of the bars on the order of 12 inches to 36 inches.

Because the respective opposite ends of the bars 22 are anchored and all force transmission to the bars is through their ends and not crosswise to the bars, so that their length must shorten by resilient buckling upon impact of the bumper, they do not act the same as springs to which the force is applied in the manner of a lever such that the action is relatively soft initially and then gradually builds up to maximum resistance. Contrary to the action of a spring, the buckling column bars resist deflection relatively constantly throughout their range of buckling resilience. Not only do the buckling column bars afford stable, substantially uniform resistance to impact force but they also return the bumper in the same uniform stable manner after the impact force or pressure terminates and the energy stored in the buckling columns effects return thereof and thereby the bumper to the original position.

It will be understood that variations and modifications may be effected without departing from the spirit and scope of the novel concepts of this invention.

I claim as my invention:

1. An energy-storing recoverable bumper system including:
   a bumper and a supporting member, said bumper being mounted in spaced relation to said supporting member and having a limited range of movement toward and away from one another;
   resilient buckling column bar means extending between said bumper and said supporting member and with a longitudinal portion of the buckling column means facing a longitudinally extending protion of the supporting member;
   means fixedly connecting opposite ends of the buckling column bar means to said bumper and said supporting member;
   and biasing means projecting toward the surface of the bar means which faces said portion of the supporting member and assuring resilient buckling of the bar means away from the supporting member in response to pressure applied against the bumper toward the supporting member.

2. A bumper system according to claim 1, said biasing means comprising a rigid element extending across substantially the longitudinal central portion of said bar means in free contact therewith.

3. An energy-storing recoverable bumper system including:
   a bumper and a supporting member, said bumper being mounted in spaced relation to said supporting member and having a limited range of movement toward and away from one another;
   resilient buckling column bar means extending between said bumper and said supporting member;
   respective abutments on the bumper and the supporting member in thrust bearing relation to the respective opposite ends of the bar means;
   at least one end portion of said means having a retaining-means-receiving opening spaced from the adjacent bar end;
   means extending through said opening and retaining said end portion in place relative to the associated abutment; and
   said bar means having an elongated longitudinally inwardly extending buckling-action-facilitating and stress-relieving slot with one end adjacent to said opening and its opposite end remote from said opening.

4. A system according to claim 3, in which said slot is an extension from said opening.

5. A system according to claim 4, said opening comprising a notch clearing said retaining means and said slot being of generally lanceolate shape with one end comprising its largest dimension and its remote end comprising its narrowest dimension.

6. a system according to claim 5, said retaining means comprising a bolt, said notch being half-round and receiving the bolt shank.

7. In a resilient buckling column bar adapted to extend between a bumper and a supporting structure to which opposite ends of the bar are connected for storing energy by resilient buckling of the bar in response to relative displacement of the bumper and structure toward one another and shortening of a straight-line distance between said bar ends, the improvement comprising:
   at least one end portion of said bar having a retaining means receiving opening spaced from the adjacent bar end; and
   an elongated longitudinally inwardly extending buckling-action1-facilitating and stress-relieving slot having an end adjacent to said opening and an opposite end remote from said opening.

8. A buckling column bar according to claim 7, said slot being an extension from said opening.

9. A buckling column bar according to claim 8, said slot being of lanceolate shape having its widest end at said opening, and said opening comprising a notch in the base end of said widest end of the slot.

10. An energy-storing recoverable bumper system including:
    a horizontally elongated bumper and a supporting structure;
    means on said structure for guding the bumper for a range of movement toward and away from said structure;

a resilient non-elastomeric buckling column bar of substantially greater width than thickness extending between said bumper and structure and having opposite end portions respectively fixed with respect to said bumper and said structure;

said bar having its width extending generally horizontally and opposite faces directed generally vertically;

one of said faces opposing a portion of said structure; and means biasing said bar to buckle resiliently in a generally vertical direction away from said structure in response to pressure applied against the bumper toward the supporting structure.

11. A bumper system according to claim 10, in which said biasing means comprises a rigid projection fixedly carried by said supporting structure at a point intermediate the length of said bar.

12. A bumper system according to claim 11, in which said guiding means comprise a rigid bracket structure fixedly connected to the bumper and comprising a bar which has its width extending vertically, said bar having a portion thereof longitudinally slidably disposed along said supporting structure, said portion of the guiding structure bar being longitudinally slotted and providing a deflection limit stop at one end of the slot, and fixed stop means on said supporting structure located to be engaged with the deflection limiting stop when the bumper is displaced toward said supporting structure by the pressure applied against the bumper.

13. A bumper system according to claim 10, in which said bumper has a horizontally extending reinforcing structure, said buckling column bar having its end portion which is fixed to said bumper lying in face-to-face relation across said reinforcing structure, and an abutment on the bumper against which the free extremity of said bumper fixed end portion thrusts.

14. An energy-storing recoverable bumper system including:

a horizontally elongated bumper and a supporting structure having a face directed in vertical direction;

means for guiding the bumper for a range of movement toward and away from said structure;

a resilient buckling column bar extending between said bumper and structure and having opposite end portions respectively fixed with respect to said bumper and said structure;

said bar buckling resiliently in a generally vertical direction in response to pressure applied against the bumper toward the supporting structure;

the end portion of the bar which is fixed to the supporting structure being flat and of substantial width horizontally and facing in vertical direction toward the supporting structure;

abutment means on the supporting structure against which an end extremity of such end portion thrusts; and means on said supporting structure for biasing said bar to buckle away from said supporting structure.

15. An energy-storing recoverable bumper system including a horizontally elongated bumper and a supporting structure;

means for guiding the bumper for a range of movement toward and away from said structure;

a resilient buckling column bar means extending between said bumper and structure having opposite end portions respectively fixed with respect to said bumper and said structure;

said bar means buckling resiliently in a generally vertical direction in response to pressure applied against the bumper and said structure;

said bar means buckling resiliently in a generally vertical direction in response to pressure applied against the bumper toward the supporting structure;

said bumper and said supporting structure having abutments against which the respective extremities of said opposite end portions of the bar means thrust;

means connecting said opposite end portions to respectively the bumper and supporting structure enabling relative pivoting of said end portions with respect to said bumper and said supporting structure during resilient buckling of the bar means; and means on said supporting structure for biasing said bar means to buckle away from said supporting structure.

* * * * *

UNITED STATES PATENT OFFICE
CERTIFICATE OF CORRECTION

Patent No. 3,751,093  Dated August 7, 1973

Inventor(s) Victor F. Herbert

It is certified that error appears in the above-identified patent and that said Letters Patent are hereby corrected as shown below:

Column 3, line 35, for "praticularly" read --particularly--.

Column 6, line 36, for "a" read --A--;
 lines 50 and 52 for "buckling-action1-facilitating" read --buckling-action facilitating--;
 line 64 for "guding" read --guiding--.

Column 7, line 11, for "means biasing" read --means on said structure biasing--.

Signed and sealed this 25th day of December 1973.

(SEAL)
Attest:

EDWARD M. FLETCHER, JR.  RENE D. TEGTMEYER
Attesting Officer  Acting Commissioner of Patents